Sept. 30, 1969 B. E. CAMMER ET AL 3,470,467

PIN INTERCONNECTION VERIFICATION SYSTEM RESPONDING TO A REPEATED OCCURENCE OF A PREDETERMINED VOLTAGE ON ONE OF THE PINS

Filed Sept. 13, 1967 10 Sheets-Sheet 1

INVENTORS
BOBBY E. CAMMER
SELBY G. VENNING

BY Gerald R. Woods

THEIR ATTORNEY

Sept. 30, 1969 B. E. CAMMER ET AL 3,470,467

PIN INTERCONNECTION VERIFICATION SYSTEM RESPONDING TO A REPEATED OCCURENCE OF A PREDETERMINED VOLTAGE ON ONE OF THE PINS

Filed Sept. 13, 1967 10 Sheets-Sheet 2

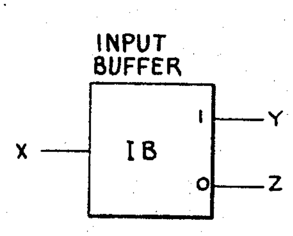
FIG. 5A
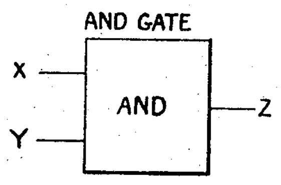
FIG. 5B
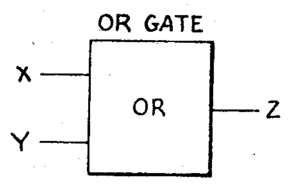
FIG. 5C
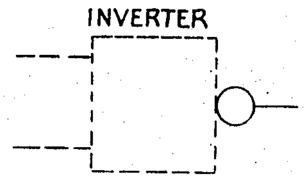
FIG. 5D
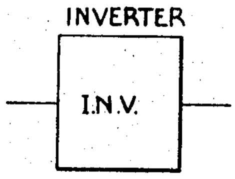
FIG. 5E
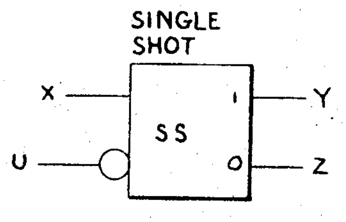
FIG. 5F
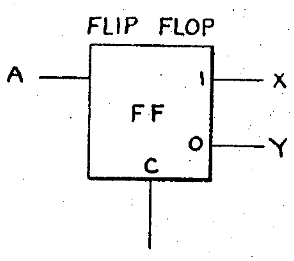
FIG. 5G
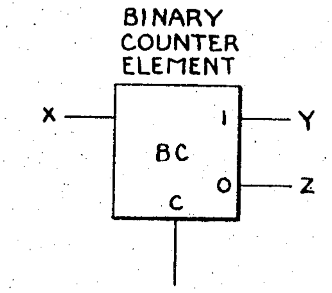
FIG. 5H
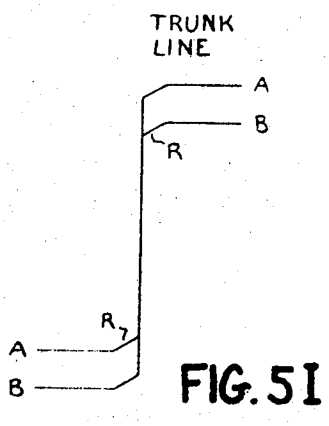
FIG. 5I
FIG. 5

Sept. 30, 1969 B. E. CAMMER ET AL 3,470,467

PIN INTERCONNECTION VERIFICATION SYSTEM RESPONDING TO A REPEATED OCCURENCE OF A PREDETERMINED VOLTAGE ON ONE OF THE PINS

Filed Sept. 13, 1967 10 Sheets-Sheet

Sept. 30, 1969 B. E. CAMMER ET AL 3,470,467

PIN INTERCONNECTION VERIFICATION SYSTEM RESPONDING TO A REPEATED OCCURENCE OF A PREDETERMINED VOLTAGE ON ONE OF THE PINS

Filed Sept. 13, 1967 10 Sheets-Sheet 10

United States Patent Office 3,470,467
Patented Sept. 30, 1969

3,470,467

PIN INTERCONNECTION VERIFICATION SYSTEM RESPONDING TO A REPEATED OCCURRENCE OF A PREDETERMINED VOLTAGE ON ONE OF THE PINS

Bobby E. Cammer and Selby G. Venning, Roanoke, Va., assignors to General Electric Company, a corporation of New York Filed Sept. 13, 1967, Ser. No. 667,525
Int. Cl. G01r 15/12, 19/08, 31/02
U.S. Cl. 324—73 8 Claims

ABSTRACT OF THE DISCLOSURE

For indicating the terminal pins for wires to be installed by an operator and for automatically verfying the correctness of the wiring, a wiring station apparatus is provided which includes registers in which wiring data from punched tape is stored. Data-derived signals are applied to a pin location display panel and to addressing circuits. After an attempt to install a wire in accord with display panel information, a probe tip is held in contact with one of the wired pins. Each of the correct terminal pins is driven in succession to a predetermined voltage. If a probe senses successive predetermined voltages, wiring correctness is verified and new wiring data enters the registers.

BACKGROUND OF THE INVENTION

The present invention relates to wiring station apparatus and more particularly to apparatus for visually indicating the location of terminal pins for a wire to be installed by an operator and for verifying automatically that the wire was properly installed by the operator.

In the manufacture of modern electronic control systems, the wiring operations required for the interconnection of circuits and circuit elements have become numerous and complex. To a certain extent, the magnitude and complexity of required wiring operations has been reduced by the use of printed circuit cards. However, due to the increased sophistication and complexity of the control systems in which the printed circuit cards are used, conventional wiring techinques are still used extensively to interconnect the receptacles in which such printed circuit cards are mounted. Since each card receptacle may have 50 or more connection points or terminal pins and an electronic control system may contain 180 or more cards, the need for communicating the proper wiring instructions to the operator who is to install the wires and for verifying that the operator has followed those instructions correctly becomes quite evident.

While display systems exist which indicate the proper terminal pins for a wire to be connected in a panel or array of printed circuit card receptacles, such known systems lack the capacity to automatically verify that the operator has correctly connected the wire in accordance with the displayed instructions. A common verification procedure requires that the operator place a jumper wire across the terminal pins which he understood were to be connected, which closes a circuit to a indicator light or bell if the wiring has been correctly installed. However, this verification procedure is time consuming and unreliable since it is carried out wholly by the operator who naturally places the jumper across the terminal pins he thought should be connected in the first place.

SUMMARY OF THE INVENTION

The present invention simplifies the task of a wiring operator by automatically verifying that he has properly installed a wire between individual pins on one or more printed circuit card receptacles. The present invention is embodied in an apparatus including a probe having a tip which may be held in contact with individual pins. The apparatus further includes addressing circuit means for successively driving the voltage on each of a pair of pins to be connected by an operator-installed wire to a predetermined voltage after the operator has attempted to install the wire. The probe tip is held in contact with one of the pins while the pin addressing means is functioning. A control means connected to the probe responds to the successive sensing of the predetermined voltage on each pin to verify that the pins have been properly connected.

DESCRIPTION OF THE DRAWINGS

While the specification concludes with claims particularly pointing out and distinctly claiming that which is regarded as the present invention, the details of one embodiment of the invention along with its further objects and advantages may be more readily ascertained from the following detailed description when read in conjunction with the accompanying drawings in which:

FIG. 5 is a glossary of the more common logic elements and drafting conventions used in the following detailed description;

DETAILED DESCRIPTION

Wiring station

Figure 1:
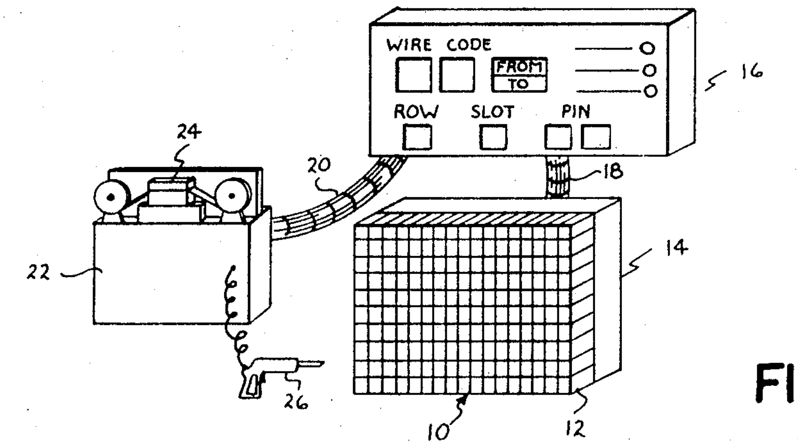
FIG. 1 is a perspective view of a wiring station into which the present invention is incorporated.

FIG. 1 shows a wiring station into which the present invention is incorporated. A card panel 10 consisting of a number of individual printed circuit cards, such as card 12, mounted in receptacles is electrically connected to a pin addressing circuit panel 14 containing a number of pin addressing circuits equal to the number of cards in the card panel 10. The pin addressing circuit panel 14 is connected electrically to a pin location display panel 16 through a multiple-wire cable 18. The display panel 16 includes data displays which indicate the type of wire to be used by the operator during each wiring step and the specific location of the terminal pins between which each wire is to be connected. The display panel 16 also includes indicator light which provide visual indications of wiring correctness and proper data input from a punched tape. Data signals for the display panel 16 are applied through a cable 20 from a console 22 containing both data storage circuitry and timing and verification circuitry. A tape reader 24 accepts wiring data from a conventional 8 channel punched tape and applies that data to the console 22. A hand-held probe 26, which may be a combination wire-attaching and indicating instrument, is connected to the console 22 and includes a tip which can be held against individual terminal pins on each of the printed circuit card receptables in the card panel 10.

Block diagram

Figure 2:
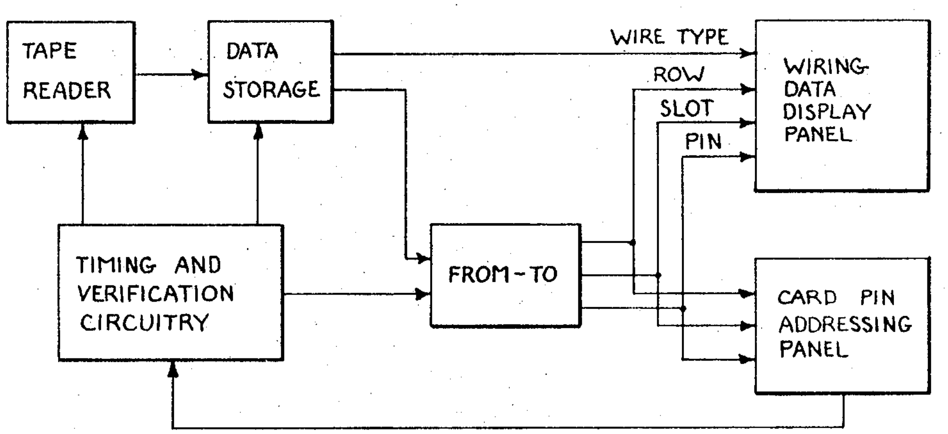
FIG. 2 is a block diagram disclosing the functional features of the present invention.

FIG. 2 is a block diagram showing the functional features of the present invention. Wiring data contained on the punched tape is read in by a tape reader and is applied to data storage circuitry. Both the operation of the tape reader and of the data storage circuitry is controlled by timing and verification circuitry which also controls the output of the data storage circuitry. Data showing the code number of the type of wire to be used is transmitted directly from the data storage circuitry to a wiring data display panel. Because of the great variety of wire sizes and insulation colors that may be required, the code number is preferably a two digit figure which allows up to 100 different code numbers to be displayed. Data identifying the location of the terminal pins to be wired together is directed through From-To circuitry. This From-To circuitry causes the wiring data display panel to indicate the location of only one of the terminal pins to which a wire is to be connected. On a subsequent operator command, the From-To circuitry causes the display panel to indicate the location of the other terminal pin to which the wire is to be connected. The data applied to the display panel is also applied to a pin addressing circuit panel. The addressing circuit panel is connected to the timing and verification circuitry to permit automatic verification of the correctness of a wiring installation by an operator. The logic circuitry which accomplishes this verification is described in considerably greater detail below.

Symbols and nomenclature

Figure 3:
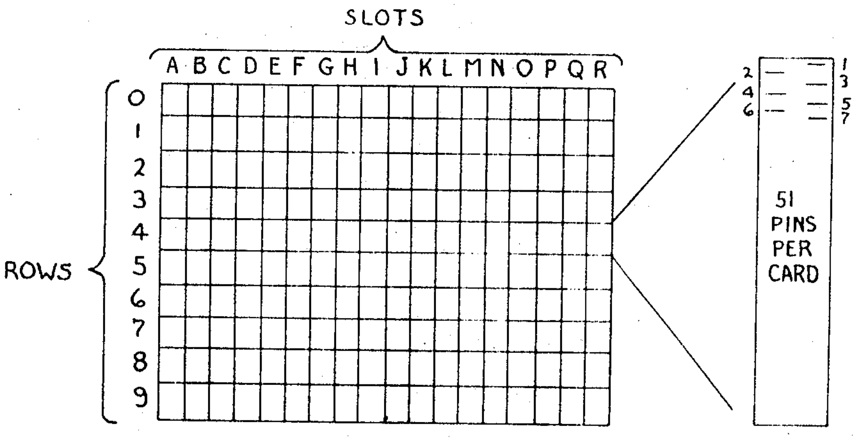
FIG. 3 is a view of a printed circuit card panel showing the nomenclature used to designate the location of particular terminal pins on cards in the panel.

However, the terms and symbols to be used will first be explained. FIG. 3 shows a card panel which in a particular embodiment consists of a number of individual printed circuit cards arranged in horizontal rows and vertical slots and mounted in card receptacles. The rows are designated by decimal numerals running from 0 to 9 while the slots are designated alphabetically by letters A through R in a complete panel. Each card includes several electronic circuits which may be connected to other circuits on the same card or on other cards through wires attached to terminal pins projecting from the one edge of the card receptacle. A preferred form of card receptacle may have 51 terminal pins arranged in two rows along the card edge. The pins may be numbered from the top to the bottom of the card receptacle with the left row containing all even numbered pins. The location of a particular pin is designated by the number of the row in which the card is located, the letter of the slot in which the card is located, and the number of the pin on the card. For example, pin location 4K23 designates pin 23 on the printed circuit card receptacle located at the intersection of row 4 and slot K.

Figure 4:
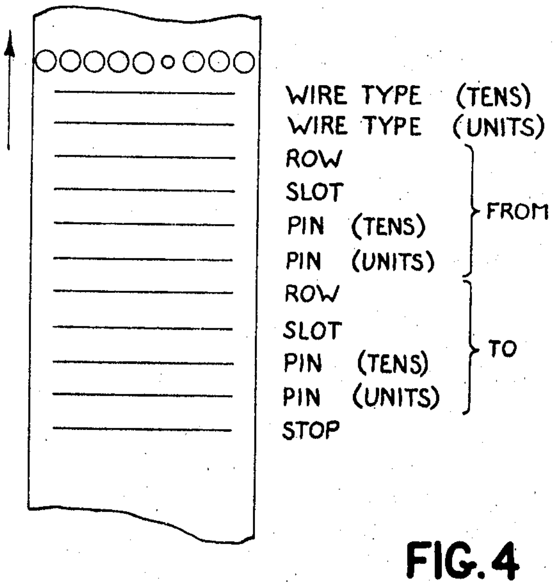
FIG. 4 is a simplified view of a punched tape showing a preferred arrangement for the levels of wiring data necessary for a single wiring step.

The wiring data required to completely wire a card panel may be encoded on an 8 channel punched tape such as that shown in FIG. 4. The wiring data necessary for the installation of a single wire is arranged in levels and includes the tens and units figures for the code number of the type of wire to be used, the number of the row and the letter of the slot containing the card having one of the terminal pins, and the number of that pin. The wiring data also includes similar information identifying the location of the other terminal pin. A stop code is punched into the tape at the end of the data required for a single wiring step. When the tape reader encounters this stop code after a set counting sequence, it prevents the input of further wiring data until the verification procedure has taken place.

FIG. 5 shows the more common logic elements and drafting conventions used in the detailed description which follows. For the logic elements shown, input terminals are usually at the left side or at the top of the symbol whereas output terminals are usually at the right side of the symbols. A terminal at the bottom of a symbol is generally a clearing terminal. The application of a logical ONE signal to this terminal causes the element to assume its reset condition. A terminal at the top of a symbol is generally a setting terminal. The application of a logical ONE signal to the setting terminal causes the element to assume its set condition.

Input buffer

FIG. 5A shows an input buffer having a single input terminal X, a normal output terminal Y, and an inverted output terminal Z. The input buffer is designed to convert contact closures to logic signals by filtering out false signals caused by contact bounce and extraneous electrical noise. When a contact closes to complete a circuit to a voltage source, the voltage rise on terminal X causes the signal on the normal output terminal Y to go to ONE (usually +5 volts) while the signal on the inverted output terminal Z goes to ZERO (usually 0 volts). If no voltage is applied at the input terminal X, the signal on the normal output terminal Y remains at ZERO while the signal on the inverted output terminal Z remains at ONE.

AND gate

FIG. 5B shows an AND gate having a pair of input terminals X and Y and a single output terminal Z. If ONE signals are applied to all of the input terminals simultaneously, the AND gate is said to be enabled and a ONE signal appears on the output terminal. If a ZERO signal is applied to any of the input terminals, the AND gate is said to be inhibited or disabled and a ZERO signal appears at the output terminal.

OR gate

FIG. 5C shows an OR gate having input terminals X and Y and a single output terminal Z. If a ONE signal is applied to any of the input terminals, a ONE signal appears at the output terminal of the enabled OR gate. If ZERO signals are applied to all of the input terminals, a ZERO signal appears at the output terminal of the inhibited OR gate.

Inverter

FIG. 5D shows one symbol for an inverter, a small circle which may appear at any of the input or output terminals of other logic elements. The inverter changes the state of any signal applied to it. For instance, if a ONE signal is applied at the left side of the inverter shown in FIG. 5D, a ZERO signal is produced at the right side. Conversely, where a ZERO signal appears at the left side of the inverter, a ONE signal appears at the right side.

FIG. 5E shows a different form of inverter symbol which is used whenever the inverter is independent of any other logic element. The characteristics of this inverter are the same as the characteristics of the inverter shown in FIG. 5D.

Single shot

FIG. 5F shows a single shot, a monostable multivibrator which may have a normal input terminal X, an inverse input terminal U, and a normal output terminal Y, and an inverse output terminal Z. When a ONE signal is applied to the normal input terminal X or a ZERO signal is applied to the inverse input terminal U, the single shot is set; i.e., the output at terminal Y goes to ONE whereas the output at terminal Z goes to ZERO for a predetermined period of time. At the end of this time, the single shot automatically resumes its reset condition wherein terminal Y has a ZERO signal and terminal Z has a ONE signal.

Flip-flop

FIG. 5G shows a flip-flop, a bistable multivibrator having a pulse input terminal A, a clearing input terminal C, a normal output terminal Y, and an inverse output terminal Z. If a ONE signal is applied to the pulse input terminal Z while a ZERO signal is applied to the clearing input terminal C, the normal output terminal Y has a ONE signal and the inverse output terminal Z has a ZERO signal. The device remains in this state even though the ONE signal is removed from the pulse input terminal A until a ONE signal is applied to the clearing input terminal C. The ONE signal at the clearing input terminal C causes the flip-flop to be reset so that a ZERO signal appears on the normal output terminal Y and a ONE signal appears on the inverse output terminal Z. The flip-flop does not change its state when the same signals are applied simultaneously to the pulse input terminal A and the clearing input terminal C.

Binary counter element

FIG. 5H shows a binary counter element having a pulse input terminal X, a clearing terminal C, a normal output terminal Y, and an inverse output terminal Z. If a ONE signal is applied at the input terminal X while the clearing terminal is held at a ZERO signal level, the trailing edge of the ONE signal causes the signal on the normal output terminal Y to change to the opposite output level. The counter element remains in this condition until a ONE signal is applied to the clearing terminal or until another ONE signal is applied to the input terminal X. A ONE signal at the clearing terminal C causes the normal output terminal Y to hold at ZERO and the inverse output terminal Z to hold at ONE.

Trunk line

FIG. 5I shows a trunk line, a drafting convention intended to eliminate multiple wires in patent drawings. Two individual wires A and B are shown entering the trunk line X at its upper end and leaving the line at its lower end. Where the trunk line symbol is used, each wire combined in the trunk line is identified at some point before it enters the trunk line and at some point after it leaves the trunk line. Trunk line connections can be distinguished from conventional wiring connections by the slanted junctions R between the individual wires and the heavier trunk line X.

Logic circuit description

Figure 6:
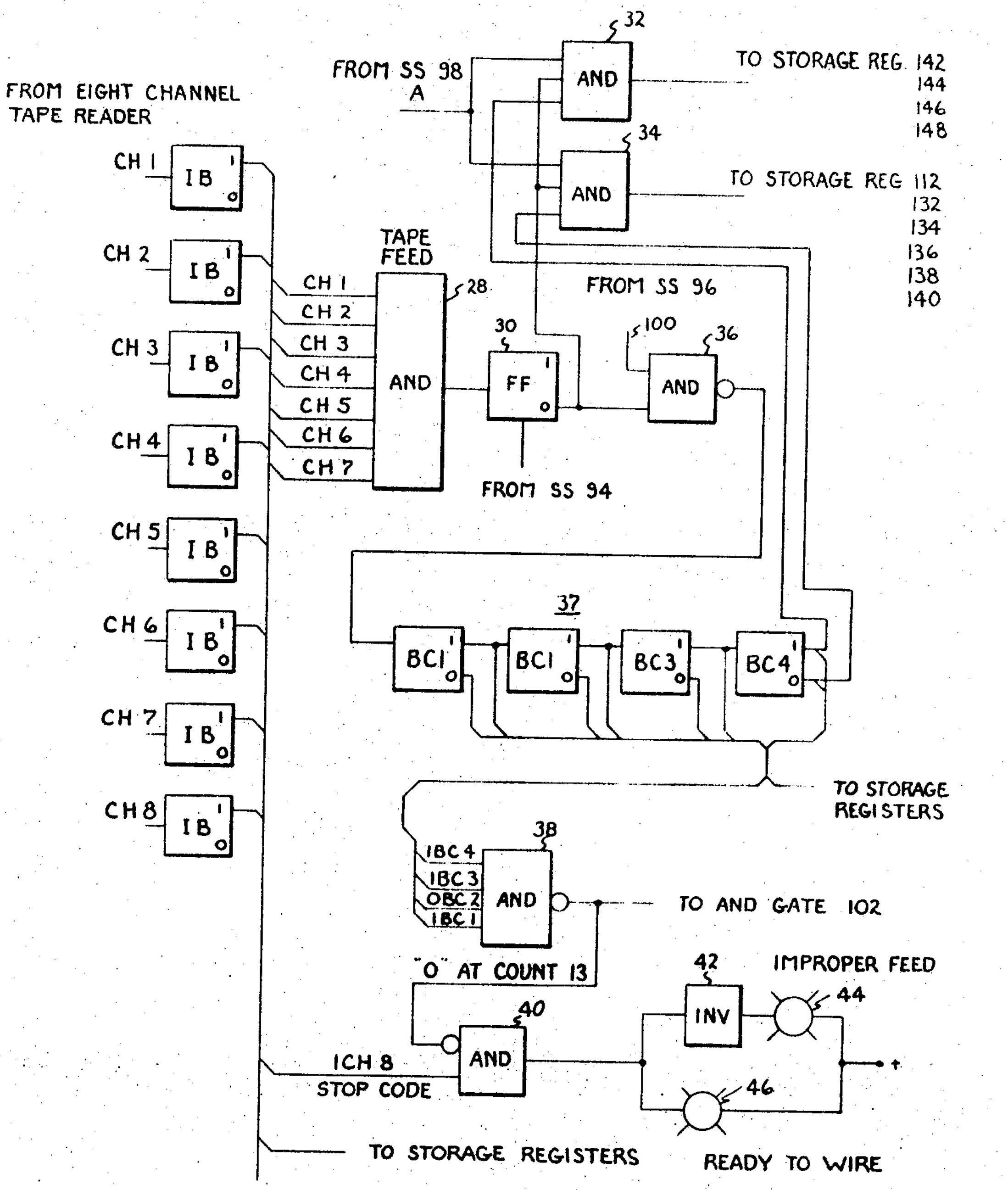
FIG. 6 is a logic diagram showing one part of the timing and verification circuitry for the present invention.

Referring now to FIG. 6, signals from the tape reader head are applied to input buffers designated CH1–CH8 for each of the eight channels of the punched tape. If the tape is punched in a particular channel, a 12 volt data signal is applied to the input buffer for that channel which results in the generation of a ONE signal on the normal output terminal of the input buffer. The normal output terminals of input buffers CH1–CH7 are connected to an AND gate 28. The AND gate 28 has its output terminal connected to the input terminal of a flip-flop 30, the inverted output terminal of which is connected to AND gates 32, 34, and 36. The output of the AND gate 36 is inverted and is applied to a counting chain 37 consisting of binary counter elements BC1 through BC4, each of which has its normal and inverted output terminals connected to data storage circuitry described below.

The normal output terminals of binary counter elements BC1, BC3, and BC4 and the inverted output terminals of binary counter element BC2 are also connected to an AND gate 38. When the counting chain 37 accumulates a decimal count of 13, the AND gate 38 produces a ONE signal which is changed to a ZERO signal by the output inverter. This ZERO signal is applied to timing circuitry described later which halts the input of data from the tape reader. The ZERO signal is also applied to an input inverter on an AND gate 40 having a second input connected to the input buffer CH8. The simultaneous occurrence of a decimal count of 13 in the counting chain and of a 12 volt data signal at the input of input buffer CH8 causes the AND gate 40 to produce a ONE signal which is applied through an inverter 42 to an Improper Tape Feed indicator 44 as well as directly to a Ready-To-Wire indicator 46. The Ready-To-Wire indicator 46 is energized only while the AND gate 40 is producing a ONE signal. At all other times, the ZERO signal at the output of the AND gate 40 is inverted by the inverter 42 to energize the indicator 44.

Figure 7:
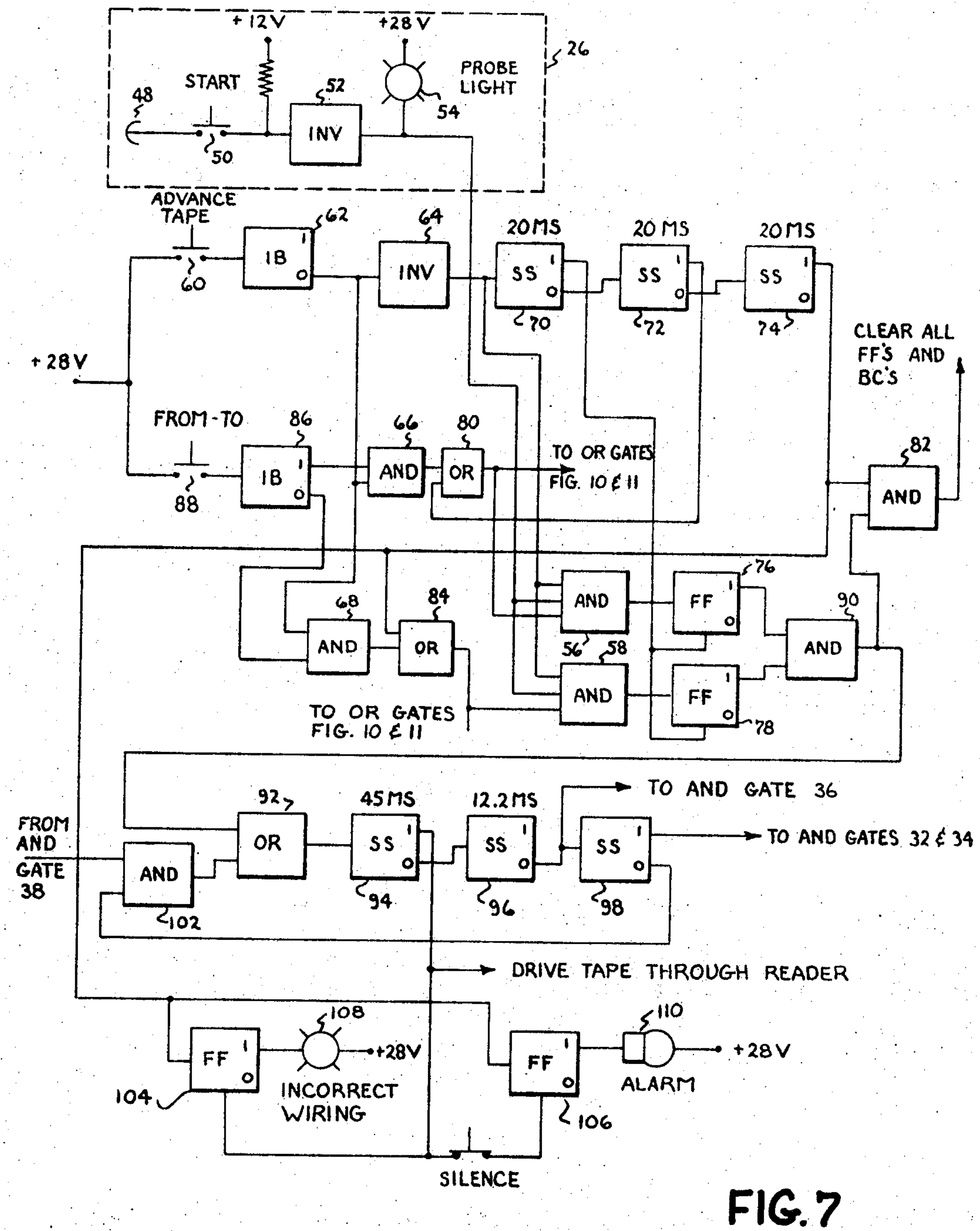
FIG. 7 is a logic diagram showing a second part of the timing and verification circuitry for the present invention.

The timing and verification circuitry for the present invention is shown primarily in FIG. 7. The probe 26 consists of a conducting tip 48 connected through a Start pushbutton 50 to an inverter 52, the output of which is connected to a probe indicator light 54 as well as to the input terminals for a pair of AND gates 56 and 58. The advance of the tape through the tape reader is initiated by a momentary-contact Advance push-button 60 connected to an input buffer 62, the inverted output terminal of which is connected both to an inverter 64 and to the inputs of a pair of AND gates 66 and 68. The output of the inverter 64 is applied to the pulse input terminal of a single shot 70, the first in a chain of single shot elements. The inverse output terminal of the single shot 70 is connected to the pulse input terminal of a second single shot 72, the inverse output terminal of which is similarly connected to the pulse input terminal of a third single shot 74. The normal output terminal of the single shot 70 is connected to the clearing terminals for a pair of flip-flops 76 and 78. The normal output terminal for the single shot 72 is connected to one input of an OR gate 80, the other input of which is provided by the AND gate 66. The normal output terminal of the single shot 74 is connected both to one input of an AND gate 82 and to one input of an OR gate 84, the second input of which is provided by the AND gate 68. The second input for the AND gate 66 is provided by a connection to the normal output terminal of an input buffer 86 having its inverse output terminal connected to the second input to the AND gate 68. The condition of the input buffer 86 is controlled by a From-To pushbutton 88, a bistable mechanical device which remains either open or closed until an operator presses the pushbutton to reverse the previously existing condition.

The output terminals of OR gates 80 and 84 are connected to input terminals of AND gates 56 and 58, respectively. A third input for each of these AND gates is provided through an electrical connection to the output of the inverter 64. The output terminals of AND gates 56 and 58 are connected to the pulse input terminals of flip-flops 76 and 78, respectively. In turn, the normal output terminals of these flip-flops are connected to the input terminals of an AND gate 90, the output terminal of which is connected to one input terminal of the AND gate 82 and to one input terminal of an OR gate 92. The OR gate 92, in turn, is connected to the input terminal of a single shot 94 having its normal output terminal connected to a tape driving mechanism and its inverse output terminal connected to the pulse input terminal of a single shot 96. The inverse output terminal of the single shot 96 is connected both to the pulse input terminal of a single shot 98 and to be the second input of the AND gate 36 through a lead 100. Whereas the normal output terminal of the single shot 98 is connected to the input terminals of the AND gates 32 and 34 of FIG. 6, the inverse output terminal of single shot 98 is applied to one input terminal of an AND gate 102, the other input terminal of which is connected to the inverse output of the AND gate 38 of FIG. 6. The normal output terminal of the single shot 94 is connected to the clearing terminals of a pair of flip-flops 104 and 106 which may be set by ONE signals on the normal output terminal of the single shot 74. The flip-flops 104 and 106 are connected to an indicator light 108 and an alarm 110 which produce visual and audible warnings when an improper wiring job has been done.

Figure 8:
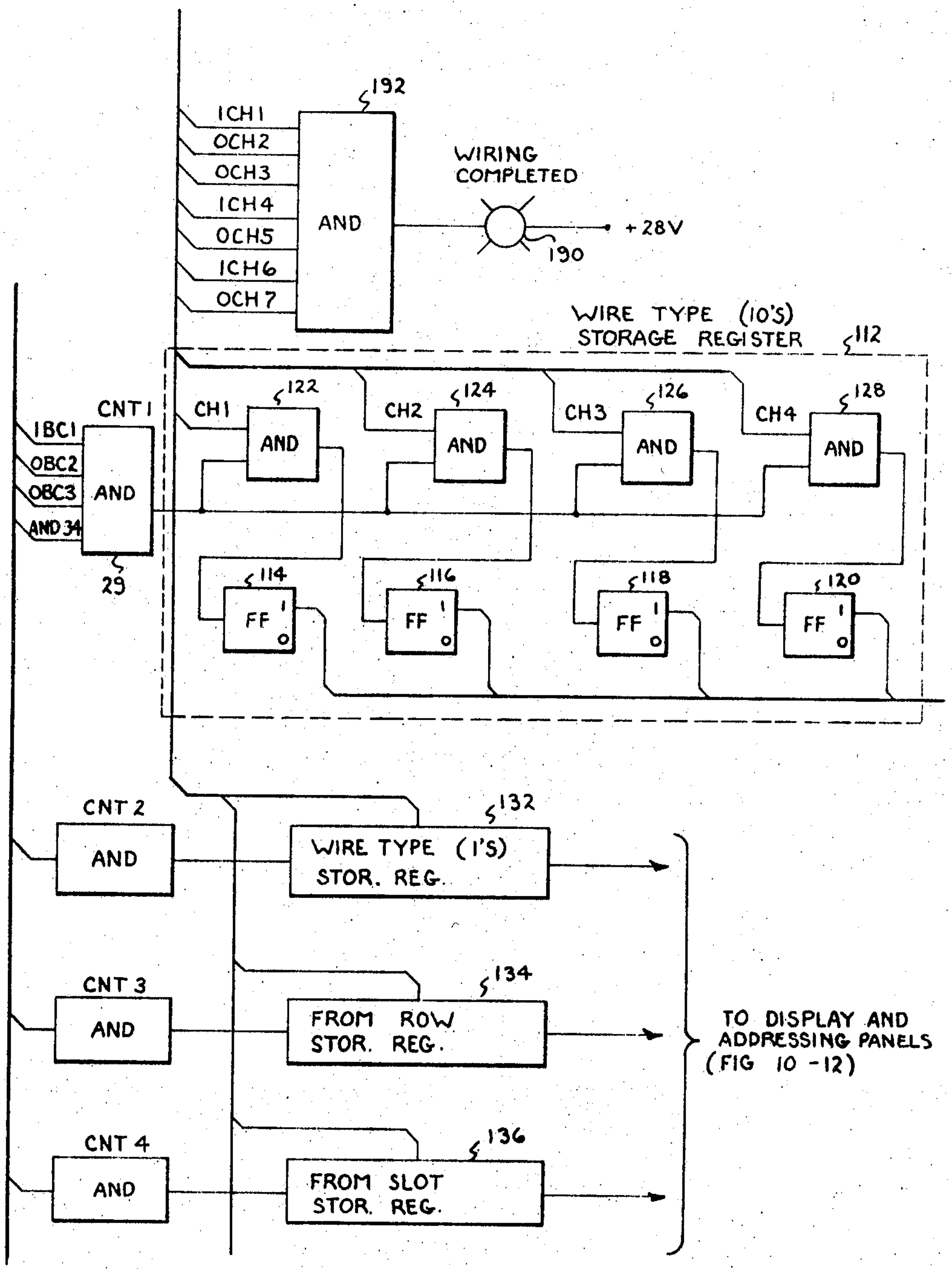
FIG. 8 is a logic diagram in partial block diagram form showing the storage registers in which wiring data is stored.
Figure 9:
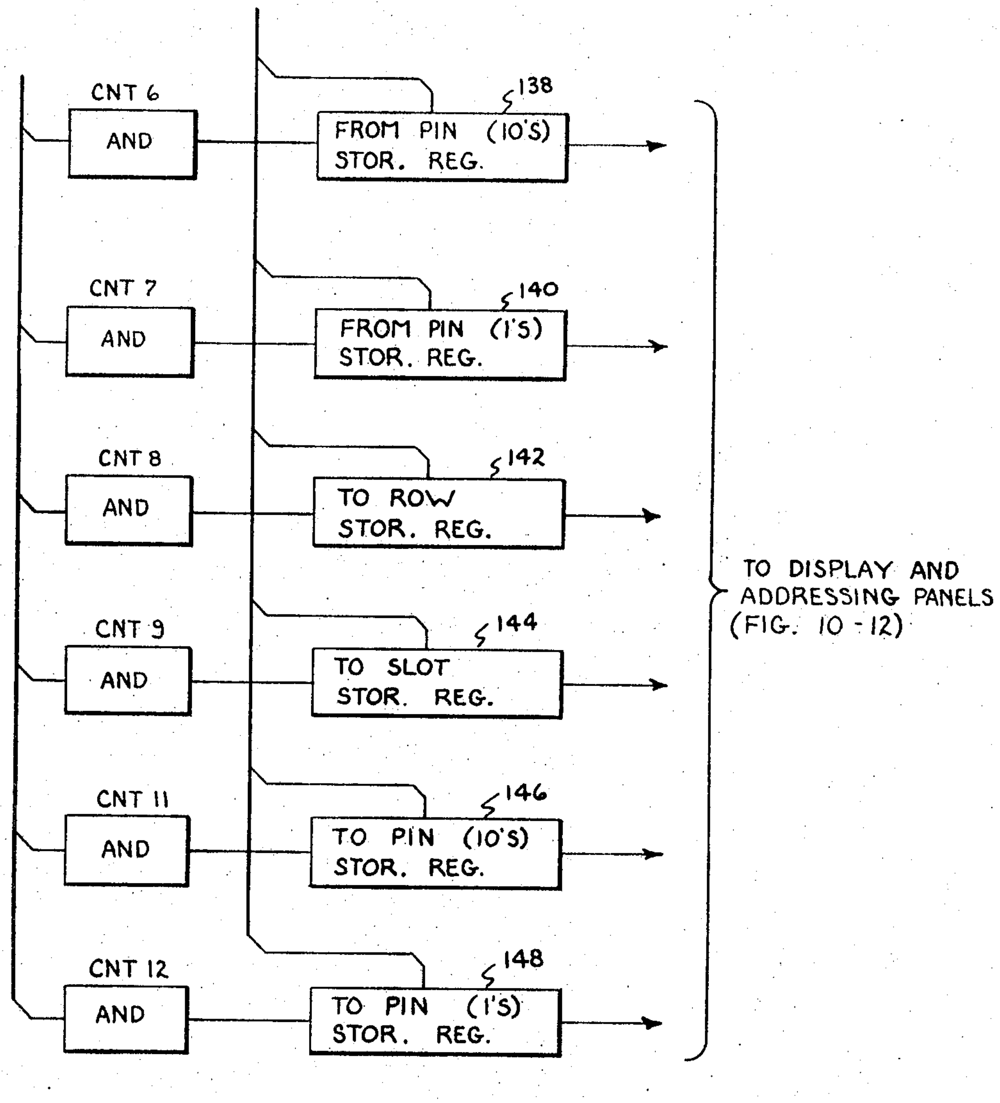
FIG. 9 is a block diagram of the remainder of the storage registers in which wiring data is stored.
Figure 10:
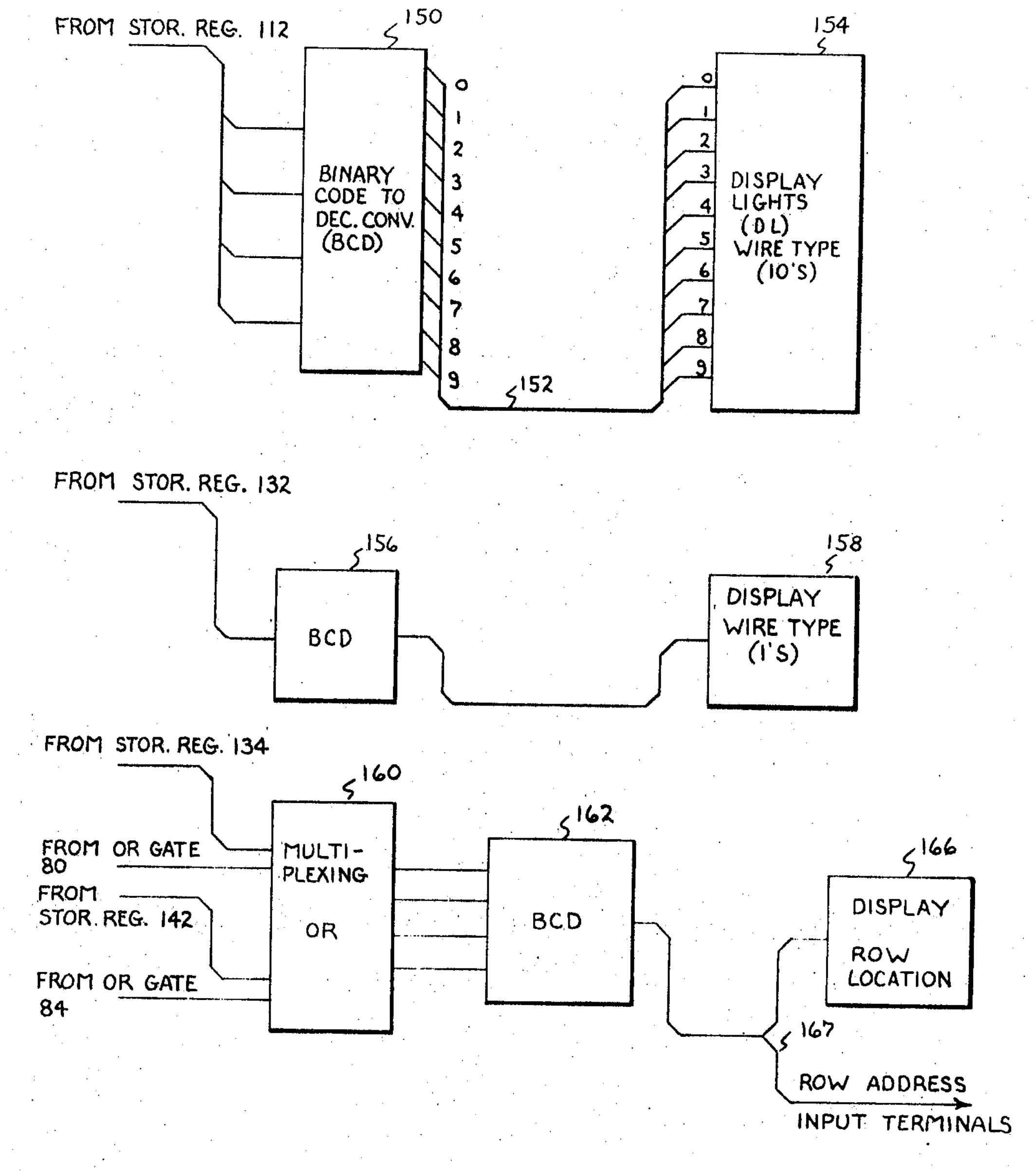
FIG. 10 is a block diagram showing some of the wiring data displays.
Figure 11:
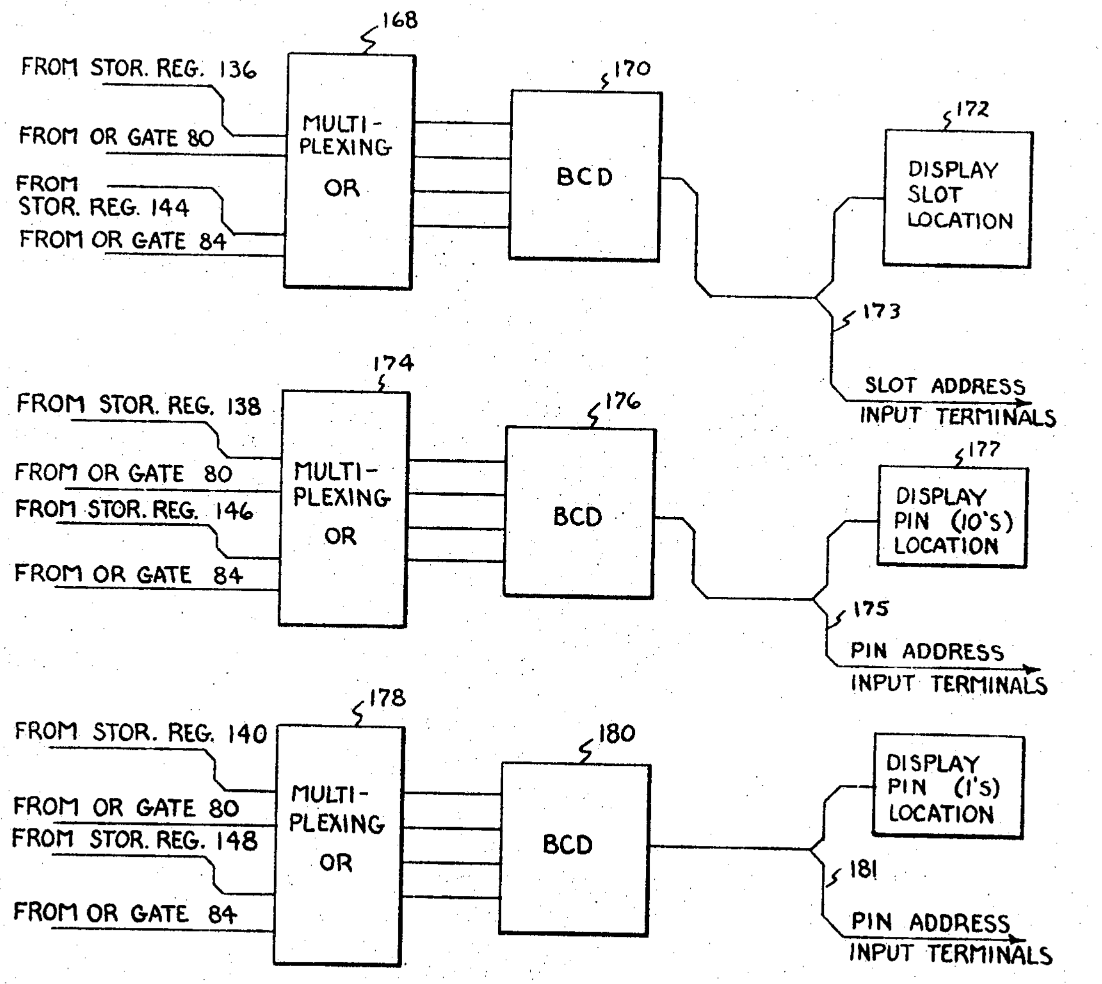
FIG. 11 is a block diagram showing the remainder of the wiring data displays.

The circuits shown in FIG. 6 automatically verify that each wire has been properly installed and also control the entry of data from the tape reader into storage registers shown in part in FIG. 8. Each storage register is similar to the storage register 112 in which binary information is stored which identifies the tens figure of the wire type code number. The storage register 112 includes a series of flip-flops 114, 116, 118, and 120 having their respective input terminals connected to the output terminals of AND gates 122, 124, 126, and 128. One input to each of these AND gates is provided by an AND gate 130 connected to the output terminals of the binary counter elements BC1 through BC4 in FIG. 6. At a decimal count of one in the counting chain, the AND gate 130 produces a ONE signal which partially enables the AND gates 122, 124, 126, and 128. The second input terminal for each of these AND gates is connected to the output of one of the input buffers for channels 1 through 4 of the punched tape. If an input buffer receives a signal indicating that its channel is punched and a count of one exists in the counting chain, the AND gate to which the buffer output for that channel is connected produces a ONE signal which sets its associated flip-flop. The normal output terminals of the flip-flops in the storage register are connected to addressing circuits and to circuits which display decimal numbers determined by the binary information contained in the storage register.

The data storage circuitry includes a storage register 132 which, upon a count of two in the counting chain, accepts and stores binary information from the second level of the punched tape identifying the units figure of the wire type code number. Storage registers 134, 136, 138 and 140 similarly provide storage for binary information contained in succeeding tape levels identifying the row number, slot letter, and pin number for the "from" terminal pin for the wire. This binary information is transferred into the storage register 134 on the count of 3, into the storage register 136 on the count of 4, into the storage register 138 on the count of 6, and into the storage register 140 on the count of 1. Binary information identifying the row number, slot letter, and pin number of the "to" terminal pin is accepted and stored in storage registers 142, 144, 146, and 148 on counts of 8, 9, 11, and 12, respectively, in the counting chain. In the particular embodiment disclosed, no information is accepted from the tape reader on the counts of 5 or 10. Depending upon the characteristics of the printed circuit cards to be wired, it may be desirable to include storage registers which would receive binary information on these counts identifying voltage busses or relays to which the wires are to be connected.

A binary code to decimal (BCD) converter 150 accepts the binary output signals from the flip-flops 114, 116, 118, and 120. Depending on the binary value of those flip-flop signals, a ONE signal appears on a particular one of the output terminals 0–9 of the BCD converter 150. The decimal value of the converted contents of storage register 112 is visually displayed on a digital display 154 connected to the BCD converter 150 through trunk line 152. The binary contents of the storage register 132 are converted to decimal form by a BCD converter 156 and applied to a digital display 158 to visually indicate the decimal value of the units figure for the wire type code number. The binary contents of the storage register 134 and the binary contents of the storage register 142, both of which identify a particular card row, are applied to a multiplexing OR gate 160. A third input to the multiplexing OR gate 160 is provided by the OR gate 80 whereas a fourth input is provided by the OR gate 84. If the output of the OR 80 gate is a ONE signal, the binary information contained in the storage register 134 is transmitted through the multiplexing OR gate 160 to a BCD converter 162. During this time, the output of the OR gate 84 is necessarily a ZERO signal since the OR gates 80 and 84 are connected to inverse output terminals of the same input buffer 86. Thus when the OR gate 84 has a ONE signal output, the OR gate 80 has a ZERO signal output so that binary information contained in storage register 142 is transmitted through the multiplexing OR gate 160 whereas the binary information contained in the storage register 134 is not transmitted. The binary information received from either storage register by the BCD converter 162 is converted to decimal form and is applied to a digital display 166 and through a suitable connector 167 to addressing circuits to be described in detail later.

The binary contents of storage registers 136 and 144 identifying a particular card slot are applied to a multiplexing OR gate 168 having third and fourth inputs connected to the OR gates 80 and 84, respectively. If the output of the OR gate is a ONE signal, the binary contents of storage register 136 are transmitted to a BCD converter 170. If the output of the OR gate 84 is a ONE signal, the binary contents of the storage register 144 transferred to the BCD converter 170. The output of the BCD converter 170 is applied both to a card slot letter display 172 and to addressing circuits through connector 173. The binary contents of storage registers 138 and 146 are applied to another multiplexing OR gate 174 along with the output signals from the OR gates 80 and 84. Depending upon the output signals from the OR gates 80 and 84, the information contained in either register 138 or 146 is applied to a BCD converter 176. The converted information is applied both to pin addressing circuits through connector 175 to a digital display 177 which visually indicates the decimal value of the tens figure of the pin number. The binary contents of registers 140 and 148 are similarly applied to a multiplexing OR gate 176 along with the output signals from OR gates 80 and 84. The outputs of the multiplexing OR gate 178 are applied to a BCD converter 180 which provides driving signals to addressing circuits through connector 181 and to a digital display 179 which visually indicates the units figure for the pin number.

Figure 12:
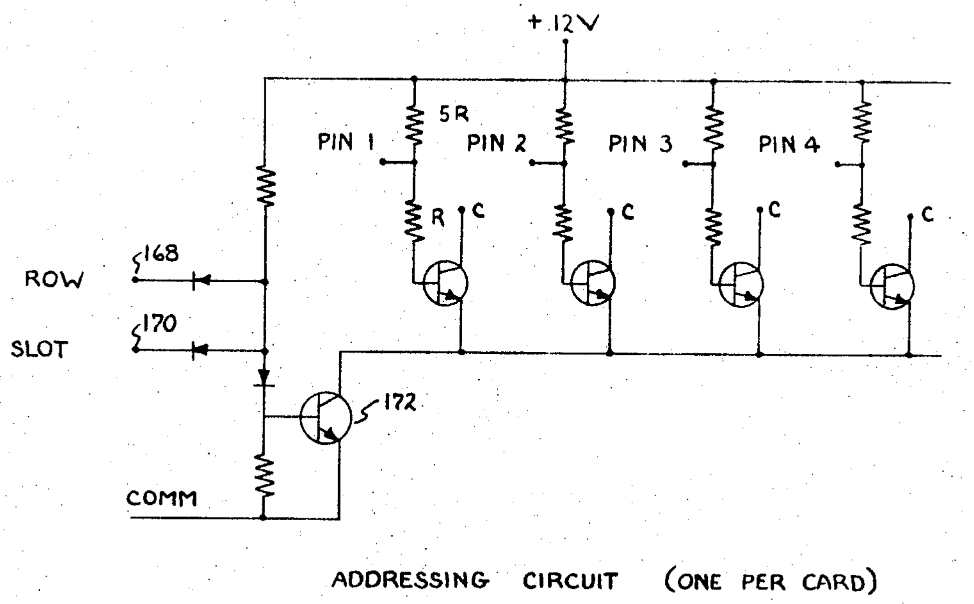
FIG. 12 is a partially completed schematic diagram of a typical addressing circuit.

The signals identifying the location of the terminal pins for a single wire are applied to the displays and to addressing circuits, such as the one shown in FIG. 12. When ONE signals are applied to the row address input terminal 168 and to the slot address input terminal 170 of the card addressing portion, the voltage applied to a controllable device such as card addressing transistor 172 rises enough to drive that transistor into conduction. When transistor 172 is conducting, a predetermined common voltage exists at the emitter terminal of each of 51 pin addressing transistor circuits including pin address input terminals pin 1, pin 2, pin 3, etc. Each pin address input terminal is connected directly to the base of a pin addressing transistor having its collector terminal C electrically connected to the terminal pins on a printed circuit card being wired. If ONE signals are applied to the row, slot, and pin address input terminals for a particular pin on a particular card, the voltage on the probe tip 48 will be the predetermined common voltage when the tip is held against that pin since the pin addressing transistor and the card addressing transistor are both conducting.

Logic circuit operation

The circuit described above operates as follows:

At the beginning of a wiring operation, the operator threads a punched tape through the tape reader until a Tape Feed punched configuration is at the reading head. This configuration may be one in which the first seven channels of the tape are punched whereas the eighth channel is left unpunched. The AND gate 28, enabled when the Tape Feed configuration is sensed, produces a ONE signal which sets flip-flop 30, thereby causing a ZERO signal to be applied to one input of the AND gate 36. The AND gate 36 is inhibited thereby and produces a ZERO signal output which is converted to a ONE signal by its output inverter before being applied to the pulse input terminal of binary counter element BC1. This ONE signal does not set a decimal count of one into the counting chain, however, since binary counter elements are triggered at the trailing edge of a ONE signal pulse rather than the leading edge of the pulse.

The operator then places the probe tip 48 on a start post (not shown) which is a voltage bus held at the common voltage level and depresses the Start pushbutton 50 to cause a ZERO signal to be applied to the inverter 52. The operator subsequently depresses the Advance pushbutton 60 to energize the input buffer 62, giving rise to a ZERO signal on its inverse output terminal. This ZERO signal is changed to a ONE signal by the inverter 64 and is used to trigger single shot 70 as well as to provide ONE signal inputs to AND gates 56 and 58. At the time the ONE signal output from inverter 64 is applied to AND gates 56 and 58, each of these AND gates already has a ONE signal input from the inverter 52. The triggering of single shot 70 produces a 20 microsecond ONE signal on its normal output terminal which is used to clear flip-flops 76 and 78. After 20 microseconds, single shot 70 returns to its normal condition and single shot 72 is triggered to cause a ONE signal pulse to be applied to one input of OR gate 80. The ONE signal consequently generated by the OR gate 80 is applied to the third input of AND gate 56 to completely enable that AND gate. As a result, flip-flop 76 is set by the ONE signal produced by AND gate 56. When the single shot 72 resumes its reset condition at the end of the 20 microsecond period, the returning ONE signal on its inverse output terminal triggers single shot 74. The ONE signal which appears on the normal output terminal of single shot 74 is applied to one input of the AND gate 82 as well as to one input of OR gate 84 and to the pulse input terminals of flip-flops 104 and 106. The OR gate 84 generates a ONE signal pulse which, in combination with the ONE signals from inverter 64 and the probe's inverter 52, completely enables AND gate 58 which produces a ONE signal setting pulse for flip-flop 78.

When both flip-flop 76 and 78 are set, the AND gate 90 is completely enabled by the ONE signals appearing on the normal output terminals of the flip-flops. The ONE signal produced by AND gate 90 is applied to one input of AND gate 82 and to one input of OR gate 92. The simultaneous appearance of one signals at both inputs to the AND gate 82 causes a clearing pulse to be generated which resets any flip-flops or binary counter elements which were driven into a set condition during a previous wiring operation.

The ONE signal at the output of AND gate 90 is also applied to OR gate 92 which responds by triggering single shot 94. Single shot 94 generates a 45 millisecond ONE signal on its normal output terminal which is applied to tape driving circuitry to cause the tape to advance one level through the tape reader. The ONE signal is also applied to the clearing terminals for flip-flops 104 and 106 to clear those flip-flops. Since the ONE signal from the single shot 94 is applied to the flip-flops 104 and 106 at essentially the same time as the ONE signal from the single shot 74 but is of much longer duration, the flip-flops 104 and 106 do not set so that neither indicator 108 nor alarm 110 is energized. The ONE signal on the normal output terminal of the single shot 94 is also used to reset the flip-flop 30, thereby producing a ONE signal on the inverse output terminal of the flip-flop which partially enables AND gates 32 and 34. When the single shot 94 returns to its reset condition, single shot 96 is triggered so that a 12.2 millisecond ZERO signal appears on its inverse output terminal; i.e., on lead 100. When the single shot 96 subsequently resets, the returning ONE signal on its inverse output terminal causes AND gate 36 to be fully enabled. A ONE signal produced by the AND gate 36 is converted to a ZERO signal by the output inverter to cause the binary counter element BC1 to assume a decimal count of one. The resetting of the single shot 96 also triggers single shot 98 which produces a 20 microsecond ONE signal on its normal output terminal and a 20 microsecond ZERO signal on its inverse output terminal.

When the single shot 98 returns to its normal condition after 20 microseconds, the ONE signal appearing on the inverse output terminal along with the ONE signal which exists at the output of the AND gate 38 at any count other than 13 in the counting chain causes the AND gate 102 to produce a ONE signal to trigger single shot 94 through the OR gate 92. The tape advances one additional level through the tape reader upon this second triggering of single shot 94. The subsequent triggering and return of single shot 96 to its normal condition causes the counting chain to accumulate a decimal count of 2. The signal on the inverse output terminal of the single shot 98 is again fed back to the AND gate 102 to cause the single shot chain to be triggered with the tape being advanced one level and the counting chain accumulating one additional decimal count each time. The repetitive triggering continues until the counting chain accumulates a decimal count of 13, at which time the AND gate 38 produces a ONE signal which is inverted before being applied to one input of the AND gate 102 to halt the counting sequence.

When single shot 98 is triggered at the first count in this 13 step counting sequence, AND gate 29 is enabled to provide ONE signal inputs to each of the AND gates 122, 124, 126, and 128 in the storage register 112. A second input to each of these AND gates is provided by different ones of the input buffers associated with channels 1 through 4 of the tape reader. If the tape reader senses a punched hole in one of those channels, the simultaneous occurrence of ONE signals at the AND gate connected to the input buffer for that channel causes the setting of the flip-flop connected to the output of the AND gate. Each flip-flop remains in the condition established at this time until the beginning of the next wiring step. At the count of two, the binary information contained at the second level of the tape is accepted by and stored in the storage register 132. At the count of three, the third level information is fed into the storage register 134. At the end of the 13 count sequence, all information identifying the location of the pins between which the first wire is to be connected and the type of wire to be used is stored in the storage registers.

The binary contents of the storage registers 112 and 132 are converted to decimal form by the BCD converter 150. The converted signals are applied to digital displays 154 and 158 which provide the operator with a two digit visual display of the code number of the type of wire to be used. The binary contents of either the "from" registers 134, 136, 138, and 140 or the "to" registers 142, 144, 146, 148 are also converted to decimal form and displayed to visually show the location of one of the terminal pins for the wire. If the From-To pushbutton 88 is closed, input buffer 86 is energized and a ONE signal is applied to one input of AND gate 66 whereas a ZERO signal is applied to one input of the AND gate 68. The second input to each of these AND gates is provided by a connection to the inverse output terminal of the input buffer 62 which becomes de-energized when the operator releases the momentary-contact pushbutton 60 after depressing it to initiate the 13 count sequence. When both inputs to the AND gate 66 are at a ONE signal level, a ONE signal produced by that AND gate is transmitted through the OR gate 80 to the input of the multiplexing OR gate 160. During this time, the AND gate 68 is inhibited by the ZERO signal from the input buffer 86. Similarly, the OR gate 84 is inhibited. Under these conditions the binary information contained in the storage register 134 is transmitted through the multiplexing OR gate 160 to the BCD converter 162. The converted information is applied both to the row location digital display 166 and to the row address inputs for the card addressing circuits of the type shown in FIG. 12. Under the same conditions, the binary information contained in the storage register 136 is transmitted through the multiplexing OR gate 168 to the BCD converter 170. The converted information is applied to the slot location letter display 172 and to the slot address input terminals of the card addressing circuits. The information contained in the storage registers 138 and 140 is transmitted through the multiplexing OR gates 174 and 178, respectively, to the BCD converters 176 and 180, respectively. The converted information is applied to pin location digital displays and to the pin address input terminals of the pin addressing circuits.

At this stage, the display panel should provide visual information identifying the row number, slot letter, and pin number for the pin from which the wire is to extend. If the pushbutton switch 88 were open rather than closed and the input buffer 86 were de-energized, then OR gate 84 would provide a ONE signal for each of the multiplexing OR gates whereas the OR gate 80 would provide only a ZERO signal. Under these conditions, the binary information identifying the pin location to which the wire is to extend would be visually displayed. It is irrelevant whether the operator connects a wire in a "From-To" sequence or in a "To-From" sequence so that the condition of the pushbutton 88 at the beginning of a wiring step does not matter.

Assuming the pin from which the wire is to extend is located on a card receptacle electrically connected to the addressing circuit shown in FIG. 12, applying ONE signals to the row address input terminal 168 and to the slot address input terminal 170 causes the voltage from the 12 volt source to be applied through the voltage divider arrangement to the base terminal of the card addressing transistor 172. The transistor 172 is then biased into conduction. Assuming the "from" pin is pin 3, the ONE signal at the pin 3 input terminal causes the pin addressing transistor associated with that pin to be driven into conduction. The operator can verify that he is connecting the wire to the proper pin by holding the probe tip 48 against the pin electrically connected to terminal C of the pin 3 transistor circuit. The resulting ZERO signal at the left side of the inverter 52 is converted to a ONE signal which causes the probe light 54 to be energized, thus indicating to the operator that the probe tip is on the correct pin. When the operator has soldered or otherwise connected the wire to this pin, he pushes the From-To pushbutton 88 to de-energize the input buffer 86. This causes the AND gate 68 to be enabled so that OR gate 84 applies ONE signals to each of the multiplexing OR gates 160, 168, 174, and 178. The AND gate 66 becomes inhibited upon the de-energization of input buffer 86 so that OR gate 80 provides ZERO signals for each of the multiplexing OR gates 160, 168, 174, and 178. The ONE signals applied to the multiplexing OR gates by the OR gate 84 permits the information identifying the "to" pin to be transmitted through the multiplexing OR gates to the BCD converters. After conversion this information is applied to the digital readout displays to provide a visual indication of the location of the "to" pin for the operator. The operator can verify that he is connecting the wire to the proper pin by holding the probe tip 48 against the pin to which he has attached the wire by means of probe 26. The row address, slot address, and pin address input terminals for the correct pin each has a ONE signal applied thereto so that the terminal C is at the common voltage level. The resulting ZERO signal at the terminal is transmitted through the probe tip 48 and is inverted by the inverter 52 to energize the probe light 54.

After the operator finishes connecting the wire between the two pins, he holds the probe tip 48 against one of the two pins and depresses the Advance pushbutton 60. It is at this stage in the wiring step that the automatic verification of the wiring correctness occurs. When the pushbutton 60 is depressed, input buffer 62 is energized and the zero signal on its inverted output terminal inhibits AND gates 66 and 68. The same ZERO signal is inverted by the inverter 64 to trigger the single shot 70 to clear the flip-flops 76 and 78. When the single shot 70 returns to its normal condition, single shot 72 is triggered to cause a ONE signal to be applied to the OR gate 80. The OR gate 80 subsequently applies a ONE signal to the AND gate 56 and to the inputs of the multiplexing OR gates. The binary contents of the "from" storage registers 112, 132, 134, 136, 138, and 140, are again converted to decimal and numerical form and used to drive the "from" pins addressing circuit for 20 microseconds or while the single shot 72 remains in its triggered condition. If the wire has been correctly connected to the "from" pin, an electrical path to the common voltage bus is formed through the "from" addressing pin circuit and the installed wire to the probe tip 48. The probe senses the common voltage level and produces a ONE signal which is applied to one input of the AND gate 56. This ONE signal along with the ONE signal produced by OR gate 80 and the ONE signal from the output of the inverter 64 causes AND gate 56 to produce a ONE signal which sets the flip-flop 76.

When the single shot 72 returns to its normal condition after a 20 microsecond period, single shot 74 is triggered and applies a 20 microsecond ONE signal to AND gate 82, to OR gate 84, and to the pulse input terminals of the flip-flops 104 and 106. The "to" pin drivink circuit is driven for 20 microseconds so that the voltage on the "to" pin is at the common voltage level. Since the probe tip 48 is being held in contact with the "to" pin during this time, it senses the common voltage level. When the resulting ZERO signal is applied at the left side of the inverter 52, the resulting ONE signal is applied to one input of the AND gate 58. This ONE signal along with the ONE signals from the output of the OR gate 84 and the output of the inverter 64 cause the setting of flip-flop 78. When both flip-flops 76 and 78 become set, the AND gate 90 produces a ONE signal which is applied to the AND gate 82, and to the OR gate 92. The AND gate 82 produces a ONE signal since its other input also has a ONE signal from the normal output terminal of the single shot 74. The ONE signal from AND gate 82 clears all binary counter elements and flip-flops, other than the flip-flops 76 and 78, that were set during the first wiring step. The ONE signal appearing on the output of the AND gate 90 also causes single shot 94 to be triggered, thereby advancing the tape through the tape reader. The ONE signal appearing on the normal output terminal for the single shot 94 also prevents the setting of flip-flops 104 and 106 if the wiring is correct. Single shots 96 and 98 are triggered as described earlier to continue a second 13 count sequence which allows information identifying the terminal pins for a second wire to be fed into the storage registers.

If the operator has not connected the wire between the proper pins or if the connection is not properly conductive, either the AND gate 56 or the AND gate 58 remains inhibited so that either flip-flop 76 or flip-flop 78 does not set. AND gate 90 remains inhibited and neither AND gate 82 nor OR gate 92 produce ONE signals. The single shot 94 will not be triggered and the single shot 74 will cause both flip-flops 104 and 106 to become set to energize the indicator 108 and the alarm 110. The operator is thus provided with both visual and audible indication of the incorrect wiring. The wiring may then be checked manually to determine the problem. After the problem is apparently corrected the operator places the probe tip 48 on one of the pins and repeats the verification procedure described above. If the wiring is satisfactory, the next wiring step is initiated automatically as described.

The wiring steps are carried out in succession with the above-indicated verification procedure being repeated at the completion of each step. In a preferred embodiment of the invention, an indicator 190 shown in FIG. 8 is energized when all wiring steps have been completed. The indicator 190 responds to a ONE signal generated by an AND gate 192 when that AND gate senses a Wiring Completed code on channels 1–7 the data tape. The code used to signify the completion may be one in which channels 1, 4, and 6 of the data tape are punched.

We claim:

1. A wiring station apparatus having means for verifying that at least one selected pair of individual pins on multiple pin circuit cards arranged in horizontal rows and vertical slots in a card panel are properly interconnected by a wire being installed, said apparatus being intended for use with a voltage source producing a predetermined voltage and including:

(a) a probe having a tip adapted to be held in contact with an individual pin of the selected pair;

(b) addressing circuit means including means for connection to a source of predetermined voltage, said addressing circuit means being electrically connected to the individual pins of the circuit cards for providing the predetermined voltage individually to each pin of the selected pair of pins in succession while the tip is held in contact with one pin of the selected pair after an attempt has been made to interconnect the selected pair through the installed wire; and (c) verification circuitry connected to said probe and including logic circuit means providing an output signal only upon the occurrence and reoccurrence of the predetermined voltage on the tip of said probe whereby said output signal is indicative of proper interconnection between the selected pair of pins.

2. A wiring station apparatus as recited in claim 1 in further combination with:

(a) storage register means for accepting and storing data identifying the location of each pin of the selected pair of pins to be interconnected;

(b) display panel means connected to said register means for displaying in coded form the location of the selected pair of pins identified by the data contained in said register means; and (c) connector means for applying signals derived from the data contained in said register means to said addressing circuit means whereby the voltage on each pin of the selected pair is controlled in accord with the data.

3. A wiring station apparatus as recited in claim 2 in further combination with multiplexing gate means connecting said register means to said display panel means and said connector means, said multiplexing gate means being adapted to first pass data-derived signals identifying the location of one pin of the selected pair and, upon subsequent command, to then pass data-derived signals identifying the location of the other pin of the selected pair.

4. A wiring station apparatus as recited in claim 2 wherein said verification circuitry further includes means responding to the lack of the repeated occurrence of the predetermined voltage on the tip of such probe to prevent the acceptance of new data by said register means.

5. A wiring station apparatus as recited in claim 2 wherein said addressing circuit means includes a row address input terminal, a slot address input terminal, and a plurality of pin address input terminals, all of which are electrically connected to said storage register means through said connector means, said addressing circuit means further including controllable means forming a conductive path between a particular pin on a particular card and the source of the predetermined voltage when signals derived from data contained in said storage register means are applied to the row address input terminal and the slot address input terminal for the particular card and to the pin address input terminal for the particular pin.

6. A wiring station apparatus as recited in claim 3 wherein said addressing circuit means includes a row address input terminal, a slot address input terminal, and a plurality of pin address input terminals, all of which are connected to said multiplexing gate means through said connector means, said addressing circuit means further including controllable means forming a conductive path between a particular pin on a particular card and the source of the predetermined voltage when data-derived signals transferred through said multiplexing gate means are applied to the row address input terminal and the slot address input terminal for the particular card and to the pin address input terminal for the particular pin.

7. A wiring station apparatus as recited in claim 5 wherein said controllable means includes:

(a) a card addressing transistor having the row address input terminal and the slot address input terminal electrically connected to its base terminal and further having the voltage source connected to its emitter terminal, said card addressing transistor being biased into conduction by data-derived signals applied concurrently at the row address input terminal and the slot address input terminal; and (b) a plurality of pin addressing transistors having their emitter terminals connected to the collector terminal of said first transistor, their collector terminals electrically connected to different pins and their base terminals electrically connected to different pin address input terminals, each of said pin addressing transistors being biased into conduction by a data-derived signal applied at its pin address input terminal to complete a conductive path from the pin through said card addressing transistor to the voltage source.

8. A wiring station apparatus as recited in claim 6 wherein said controllable means includes:

(a) a card addressing transistor having the row address input terminal and the slot address input terminal electrically connected to its base terminal and further having the voltage source connected to its emitter terminal, said card addressing transistor being biased into conduction by data-derived signals applied concurrently at the row address input terminal and the slot address input terminal; and, (b) a plurality of pin addressing transistors having their emitter terminals connected in common to the collector terminal of said first transistor, their collector terminals electrically connected to different pins and their base terminals electrically connected to different pin address input terminals, each of said pin addressing transistors being biased into conduction by a data-derived signal applied to its pin address input terminal to complete a conductive path from the pin through said card addressing transistor to the voltage source.

References Cited

UNITED STATES PATENTS

| | | | |
|---|---|---|---|
| 2,488,556 | 11/1949 | Parmenter | 324—66 |
| 3,252,087 | 5/1966 | Parke | 324—51 XR |

RUDOLPH V. ROLINEC, Primary Examiner

E. L. STOLARUN, Assistant Examiner

U.S. Cl. X.R.

324—51, 66